March 19, 1968     R. D. WIGHT ET AL     3,373,629
STEERING COLUMN ASSEMBLY

Filed April 29, 1966     2 Sheets-Sheet 1

INVENTORS
Robert D. Wight,
Walter W. Maltman,
Thomas C. Powell, &
Harold M. Olds W. S. Pettigrew
ATTORNEYS

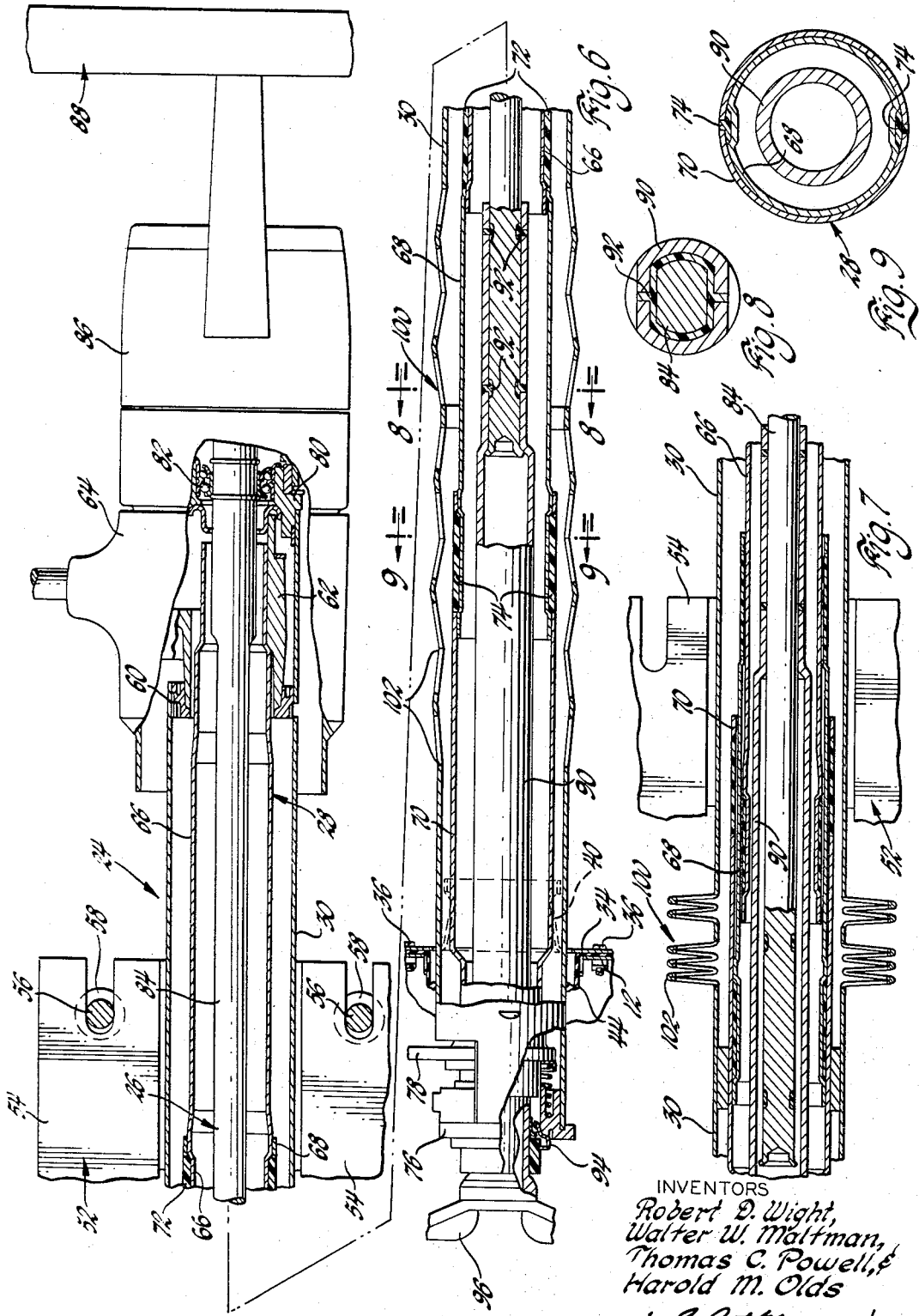

United States Patent Office 3,373,629
Patented Mar. 19, 1968

3,373,629
STEERING COLUMN ASSEMBLY
Robert D. Wight, Walter W. Maltman, and Thomas C. Powell, Saginaw, and Harold M. Olds, East Lansing, Mich., assignors to General Motors Corporation, Detroit, Mich., a corporation of Delaware
Filed Apr. 29, 1966, Ser. No. 546,312
12 Claims. (Cl. 74—492)

This invention relates to vehicle steering column assemblies and more particularly to collapsible steering column assemblies for vehicles.

One feature of this invention is that it provides an improved collapsible steering column assembly for use in vehicles. Another feature of this invention is that it provides an improved collapsible steering column assembly operative to absorb impact applied thereto. A further feature of this invention is that it provides an improved steering column assembly including a telescopic steering shaft connected between the vehicle steering gear and an interior manual steering instrumentality, and a support jacket mounting the steering shaft on the vehicle body for normal operation of the steering gear and further operative to absorb impact applied to the steering column and impart controlled resistance to telescoping movement of the steering shaft. Yet another feature of this invention is that it provides an improved steering column assembly including a tubular energy absorbing member constructed of a mesh-like network of interconnected strips arranged to structurally yield under impact applied thereto and to undergo controlled plastic deformation to absorb energy of the impact. Yet a further feature of the invention is that it provides an improved collapsible steering column assembly including a support jacket having an impact energy absorbing portion, so constructed as to have high bending strength for proper support of the steering shaft within the vehicle yet provide for a maximum amount of axial collapse and energy absorption within the column under impact. Still another feature of this invention is that it provides an improved energy absorbing steering column system including an energy absorbing column member mounted at one end to the fire wall of the vehicle body and at its other end to a steering column support spaced from the fire wall in such manner as to absorb impact applied to the said other end in a direction toward the fire wall and further operate as a second stage absorber of reversely directed impact on the fire wall end of the member causing distortion of the fire wall and first stage energy absorption therein.

These and other features and advantages of the invention will be readily apparent from the following specification and the drawings wherein:

FIGURE 6 is an enlarged broken away view partially in section taken generally along the plane indicated by line 6—6 of FIGURE 1, showing the steering column assembly in normal configuration;

FIGURE 7 is a view similar to FIGURE 6 showing the steering column assembly in collapsed configuration;

FIGURE 8 is an enlarged sectional view of the steering shaft taken generally along the plane indicated by line 8—8 of FIGURE 6; and FIGURE 9 is an enlarged sectional view taken generally along the plane indicated by line 9—9 of FIGURE 6.

Figure 1:
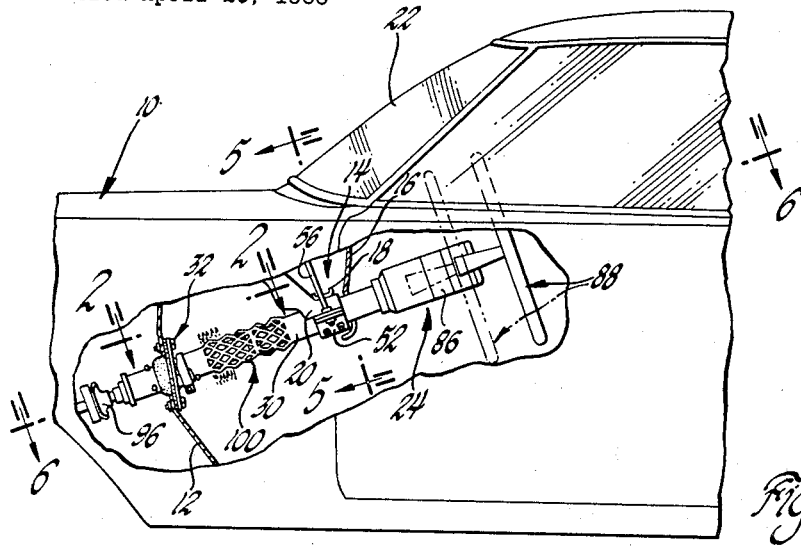
FIGURE 1 is a fragmentary partially broken away elevational view of an automotive vehicle including a collapsible steering column assembly according to the invention.

Referring now particularly to FIGURE 1 of the drawings, the steering column assembly of the invention is shown arranged in an automotive vehicle body, designated generally as 10, conventionally including a forward fire wall structure 12 separating the passenger compartment from the forward body compartment. The body further includes a generally conventional instrument panel structure 14 spaced from the fire wall structure 12 and including a face panel 16 extending transversely between the opposite front door pillar structures of the body, not shown, a reinforcing channel or similar structure 18 joined with the opposite pillar structures for rigidity, and a steering column support portion 20 welded or otherwise integrated at one end thereof with the face panel 16 and channel 18 and extending generally upwardly and forwardly of the body for a rigid mounting adjacent the upper cowl or plenum structure of the body beneath the windshield 22, not shown in detail.

Figure 2:
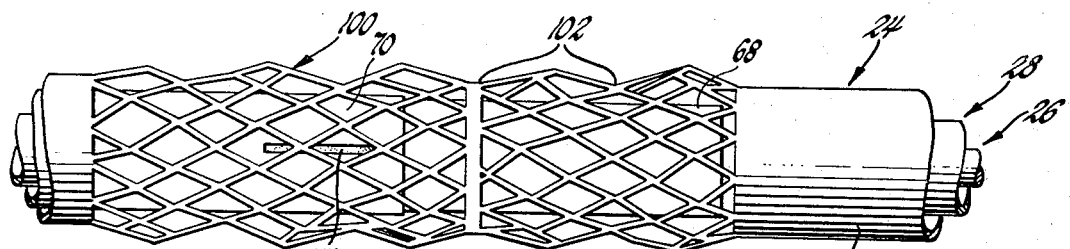
FIGURE 2 is an enlarged view of a portion of the steering column assembly.

The steering column assembly of the invention, designated as 24, generally includes an inner steering shaft assembly 26, a concentric transmission shift tube assembly 28 encircling the steering shaft assembly, and an outer supporting column or mast jacket 30, FIGURES 2 and 6.

Figures 3, 4, 5:
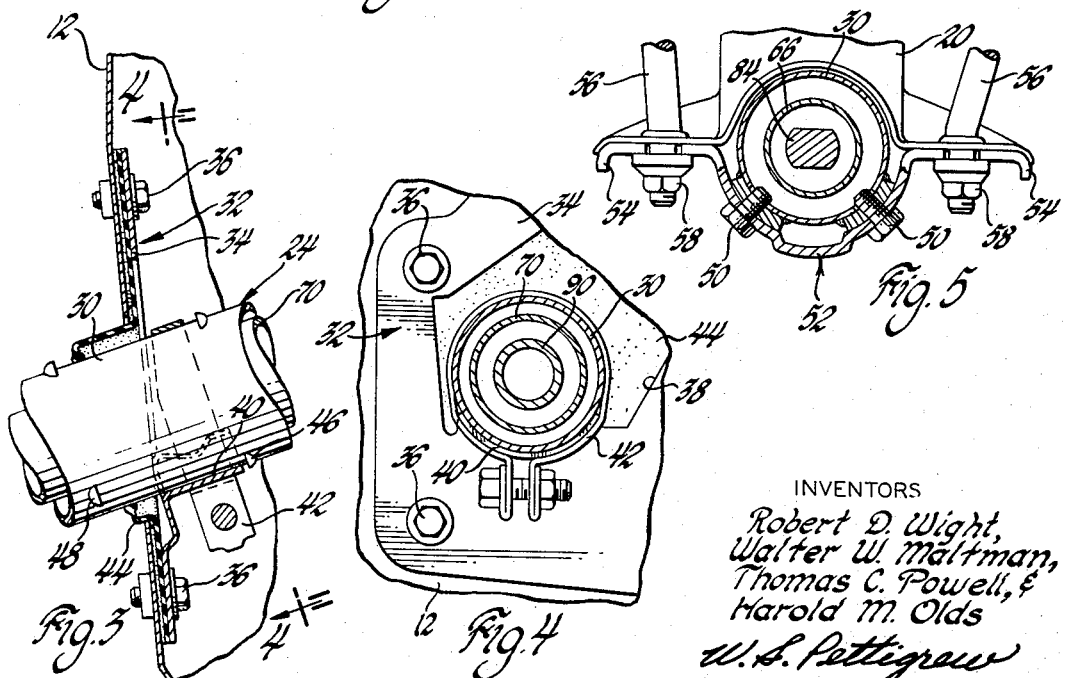
FIGURE 3 is an enlarged view in section of a portion of FIGURE 1 showing the fire wall mounting of the steering column assembly.
FIGURE 4 is a sectional view taken generally along the plane indicated by line 4—4 of FIGURE 3.
FIGURE 5 is an enlarged sectional view taken generally along the plane indicated by line 5—5 of FIGURE 1.

Referring to FIGURES 1 and 3 through 5, the mast jacket 30 is supported at its lower end portion on the fire wall structure 12 by a fire wall bracket assembly 32 including a plate 34 mounted to the fire wall structure at the interior side thereof by a number of fasteners 36, and provided with an opening 38 and an arcuate support flange 40 having generally the shape of the mast jacket 30, FIGURES 3 and 4. A strap clamp 42 encircles the mast jacket and overlies the flange 40, and is preferably tightened to a substantial degree thereover for a high frictional securement between the mast jacket and plate 34. A rubber grommet 44 embraces the mast jacket to prevent the entry of dirt, moisture, etc., into the passenger compartment through the opening 38. Mast jacket 30 is provided with spaced series of lanced projections 46 and 48 engageable with the flange 40 and the clamp assembly 42 in the event of axial displacement of the mast jacket in either direction from the position shown.

Referring to FIGURE 5, the upper end portion of the mast jacket 30 has secured thereto by fasteners 50 a generally U-shaped mounting strap 52 including a pair of ears 54 having rearwardly opening slots, also seen in FIGURE 6. The mast jacket is nested within the complementary contours of the support portion 20 as shown, and a pair of hangar bolts 56 are suspended from the cowl or adjacent structure of the body to extend through apertures in the support portion 20, and into the slots in the ears 54 of strap 52. Nuts 58 are tightened onto bolts 56 to a degree sufficient for firm vertical support of the mast jacket but not so tight as to present any substantial frictional resistance to axial displacement of the mast jacket forwardly from the support portion 20.

Referring now to FIGURES 1 and 6, the mast jacket 30 has mounted thereto adjacent its upper end a shift tube support block 60 having rotatably supported therein the inner hub portion 62 of a shift barrel 64 which mounts the conventional shift hand lever. Press-fitted or otherwise nonrotatably secured within hub 62 is one end of an upper section 66 of the shift tube assembly 28, the other end of section 66 being received within an intermediate section 68 in turn having its lower end received within a lower section 70. The upper ends of sections 68 and 70 are each provided with a pair of closed axial slots, in the manner indicated in FIGURE 2, while the lower ends of sections 66 and 68 are provided with pairs of lanced depressions aligned with the pairs of slots to provide cavities suitable for the molding in situ of plastic keys 72 and 74 for nonrotatable and axial securement between the three shift tube sections, FIGURE 9. The lower end of section 70 is rotatably mounted in conventional manner in an adapter or bearing block 76 fixed to the lower end of mast jacket 30, section 70 carrying the usual radially extending shift arm 78 for operative connection with the vehicle power transmission selector linkage, not shown.

At its extreme upper end, mast jacket 30 has fixedly mounted thereto a steering shaft bearing block 80 carrying a ball bearing 82 in turn supporting the upper end portion of an upper shaft section 84 of steering shaft assembly 26. Shaft 84 has a spline or other suitable connection to the hub 86 of a conventional steering wheel 88. At its lower end, the shaft 84 has its sides flattened in double D-shape fashion, best viewed in FIGURE 8, and is received within the complementarily shaped upper end of a lower tube section 90 of the steering shaft assembly. Opposed pairs of apertures in tube 90 are aligned with opposed pairs of recesses in shaft 84 to define cavities suitable for molding in situ of plastic shear pin structures 92 which axially secure the shaft and tube together. The lower end of tube 90 is rotatably supported in conventional fashion by a ball bearing assembly indicated at 94 supported on adapter 76, the extreme lower end of the tube being formed with an upper portion 96 of a conventional flex coupling. As indicated in FIGURE 1, the flex coupling connects with the input stub shaft or the like of a conventional steering gear box, not shown, mounted to the frame or other rigid portion of the vehicle.

Referring now to FIGURES 1, 2 and 6, mast jacket 30 is provided intermediate its fire wall and instrument panel mountings with an energy absorbing mesh portion 100 constructed of a network of intersecting and interconnected strips directed angularly of the axis of the steering column. The network may be formed in any number of ways, it being found preferable to simply provide the diamond shape perforations in the flat stock of the mast jacket before forming it into a cylinder. The mesh portion 100 is provided with a number of radial bulges of shallow V-shaped configuration in profile. These bulges define a number of energy absorbing mesh sections 102.

Each of the various strips in each mesh section 102 is subject to distributed compression loading, as will be described, operative to cause an induced buckling or folding radially outwardly from the formed configuration of FIGURES 2 and 6, to the collapsed state shown in FIGURE 7. When a predetermined compression loading is reached in each of the mesh sections, the strips therein yield and undergo a known degree of plastic deformation operative to absorb the load while collapsing.

The amount of energy absorption in the several mesh sections 102 is dependent upon many variables including the wall thickness of the various strips, the width thereof, the degree of radial bulge with which the sections are formed, the shape of the bulge, as well as the orientation of the strips in the network. Each mesh section 102 is subject to buckling independently of the others, there being no predetermined order in which the several section collapse. In the embodiment shown, the plastic strain energy absorption areas are localized generally to the portions in the network immediate to the crest and ends of the various V-shaped bulges. However, this shape permits full folding of each section 102 flat upon itself as shown in FIGURE 7, to provide for maximum collapse within the mesh portion 100. More rounded bulges may be used to increase the distortion and energy absorption in each section 102 if the full collapse shown in FIGURE 8 is not required. The degree of preset radial bulge in the various mesh sections 102 also determines the load at which the various strips therein will yield and begin to plastically deform. The interconnection or integral formation of the various strips in the network provides for the necessary bending strength required in the mast jacket 30 for proper support of the various steering column members in normal use. While the orientation of the strips in the network may vary, the angular disposition thereof is found preferable for maximum distribution of compression loading and utilization of each of the strips as an energy absorbing element.

In the event of a forward impact on the steering wheel 88 of the predetermined magnitude necessary for buckling of any of the mesh sections 102, the mast jacket 30 will crush and the steering shaft assembly 26 and shift tube assembly 28 will telescope. From FIGURE 6, it is seen that the load on the steering wheel transfers from hub thereof and from shift barrel 64 directly through the bearing block 80 and support block 60 to the mast jacket 30. As above described, the securement of mounting strap 52 is made in a manner allowing quick release of the bolts 56 out of the slotted ears 54 under the forward axial load on the column. The shear strength of the shear pins 92, as well as that of the shift tube keys 72 and 74 is preferably set for failure thereof at a load less than that needed for buckling of any one of the mesh sections 102. This shear in the telescoping assemblies, of course, proceeds from the reaction provided by the steering gear and arising in the flex coupling and adapater 76, upon which latter the steering shaft and shift tube assemblies bottom. Certain frictional energy dissipation may by design arise from the telescoping of the shift tube and steering shaft assemblies 28 and 26 upon themselves, but the primary compression loading and energy absorption is best directed to mast jacket 30 by keeping such telescoping friction at a relatively low value. The clamp 42 provides for some frictional axial securement of the mast jacket on the fire wall and further maintains the mast jacket on flange 40 of plate 34 so that upon any forward slippage through the clamp projections 46 will engage with the clamp and flange 40 to firmly bottom the mast jacket on the fire wall structure.

The mast jacket 30 also performs as an element in an energy absorbing system operating on rearwardly directed impact energy on the steering column. For example, any displacement of the vehicle steering gear tending to push the coupling portion 96, adapter 76 and mast jacket 30 of the steering column in a rearward direction, is met with the fire wall structure 12 by virtue of the projections 48 bottoming on the plate 34. Should the impact energy be severe enough to distort the fire wall structure in the portions thereof adjacent the steering column, the instrument panel structure 14 aided by the cowl and door pillar structures of the body provides for a reaction through bolts 56 and mounting strap 52 whereby to set up compression in the mast jacket 30 and operation of the energy absorbing mesh section 100.

In these events, the distortion in fire wall structure 12 provides for a substantial primary or first stage impast energy absorption, and the mesh portion 100 becomes a second stage impact energy absorber operating as a result of fire wall distortion and against the reaction of the instrument panel structure 14. It is apparent that these rearward impacts cause telescoping of the steering shaft and shift tube assemblies 26 and 28 in the same manner as above described, in this case against the reaction of bearing block 80, etc., in the restrained upper portion of mast jacket 30.

Having thus described the invention, what is claimed is:
1. In a vehicle including a steering gear, a steering column assembly comprising, telescopic steering shaft means operatively connected at one end thereof to said steering gear and at the other end thereof to a manual steering instrumentality, a tubular energy absorbing member arranged about said shaft means in a manner to be operative during telescopic movement of said shaft means, said shaft means being mounted for rotation within said energy absorbing member, said member being constructed of a mesh-like network of intersecting strips at least part of which are directed nonparallel with the axis of said shaft means, said network of strips being arranged to structurally yield upon the application of a predetermined impact to said shaft means thereafter to undergo controlled plastic deformation beyond yield to absorb such impact.

2. A steering column assembly as recited in claim 1 wherein said tubular member supports said shaft means, said strips throughout the network thereof being interconnected at the various junctures therebetween for high bending strength in said tubular member and said mounting means.

3. A steering column assembly as recited in claim 1 wherein said tubular member is provided with a plurality of radial bulges defining a number of energy absorbing mesh sections subject to independent and successive structural yielding and deformation in accordion-like fashion.

4. A steering column assembly as recited in claim 3, wherein said bulges are generally of V-shape in profile to induce full axial folding of each of said energy absorbing mesh sections flat upon itself.

5. In a vehicle including a steering gear, a body having a fire wall and a steering column support structure spaced from the fire wall, a telescopic steering shaft assembly extending through the fire wall and connected at one end thereof to said steering gear and at the other end thereof to a manual steering instrumentality within the body, an energy absorbing steering column system comprising, a support jacket, means for rotatably supporting the steering shaft assembly within the support jacket, means fixedly securing one end of said support jacket to said fire wall, means mounting the other end of said support jacket on said support structure in a manner permitting movement relative thereto in one direction but preventing movement in the other direction relative thereto, said jacket including a portion intermediate the ends thereof constructed and arranged to structurally yield under the application of a predetermined impact in said one direction thereto against the reaction of said fire wall and to undergo plastic deformation beyond yield to absorb such impact, said energy absorbing portion being further subject to structural yielding and plastic deformation under the application of a predetermined impact to said steering column in said other direction following deformation of said fire wall and energy absorption therein against the reaction of said mounting means.

6. An energy absorbing column system as recited in claim 5 wherein said jacket portion is constructed of a mesh-like network of intersecting and interconnected strips.

7. An energy absorbing steering column system as recited in claim 6 wherein said jacket portion is generally tubular and provided with a plurality of radial bulges defining a number of energy absorbing mesh sections subject to independent and successive structural yielding and plastic deformation in accordion-like fashion.

8. In a steering mechanism for a vehicle of the type having spaced support means mounting a steering jacket, steering shaft means including telescopically related sections extending through and rotatably supported by the steering jacket, a manual steering instrumentality secured to one steering shaft section and a steering gear device secured to another steering shaft section, the improvement comprising providing a portion of the steering jacket with an axially extending series of peripheral perforations to form an energy absorbing lattice of interconnected strip elements arranged to yield in generally radial direction to axially shorten the steering jacket upon the application thereto of a predetermined axially directed force.

9. The improvement set forth in claim 8 including providing the support means at the steering instrumentality end of the steering jacket with a connection thereto that permits the steering jacket to move axially only in the direction of the other support means.

10. The improvement set forth in claim 8 wherein the strip elements are arranged in askew relation to the axis of the steering jacket to provide it with rigidity against bending from the application thereto of radially directed force couples.

11. The improvement set forth in claim 10 wherein the energy absorbing lattice is annularly corrugated to provide a series of independently collapsible sections.

12. The improvement set forth in claim 10 wherein the energy absorbing lattice is annularly corrugated with each corrugation being generally V-shaped in axial section to provide a series of independently fully collapsible sections.

References Cited

UNITED STATES PATENTS

| | | | |
|---|---|---|---|
| 3,198,288 | 8/1965 | Presunka | 188—1 |
| 3,236,333 | 2/1966 | Mitchell | 188—1 |
| 3,262,332 | 7/1966 | Wight | 74—493 |

MILTON KAUFMAN, *Primary Examiner.*